US009710263B2

(12) United States Patent
Dhoolia et al.

(10) Patent No.: US 9,710,263 B2
(45) Date of Patent: Jul. 18, 2017

(54) UNDERSTANDING COMPUTER CODE WITH HUMAN LANGUAGE ASSISTANCE (71) Applicant: International Business Machines Corporation, Armonk, NY (US)

(72) Inventors: Pankaj Dhoolia, Ghaziabad (IN); Senthil Kumar Kumarasamy Mani, Gurgaon (IN); Vibha Singhal Sinha, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 22 days.

(21) Appl. No.: 14/037,800

(22) Filed: Sep. 26, 2013

(65) Prior Publication Data
US 2015/0089477 A1    Mar. 26, 2015

(51) Int. Cl.
G06F 9/44    (2006.01)

(52) U.S. Cl.
CPC ..................................... *G06F 8/73* (2013.01)

(58) Field of Classification Search
None
See application file for complete search history.

(56) References Cited

U.S. PATENT DOCUMENTS

| 6,496,793 | B1* | 12/2002 | Veditz et al. ....................... 704/8 |
| 6,698,013 | B1* | 2/2004 | Bertero ..................... G06F 8/71 717/101 |
| 7,921,414 | B2 | 4/2011 | Lakshminarasimhan |
| 8,332,355 | B2 | 12/2012 | Cannon et al. |
| 8,356,275 | B2* | 1/2013 | Nagaoka ........................ 717/105 |
| 8,417,702 | B2* | 4/2013 | Harger et al. .................. 707/736 |
| 8,473,901 | B1* | 6/2013 | Johnson ........................ 717/110 |
| 8,612,893 | B2* | 12/2013 | Fitzpatrick et al. ........... 715/856 |
| 2002/0062477 | A1* | 5/2002 | Sasaki ....................... G06F 8/73 717/136 |
| 2002/0194579 | A1* | 12/2002 | Dollin ................. G06F 9/44589 717/126 |
| 2002/0199005 | A1* | 12/2002 | Schneider et al. ............ 709/229 |
| 2003/0074190 | A1* | 4/2003 | Allison ........................... 704/10 |
| 2003/0145282 | A1* | 7/2003 | Thomas .................... G06F 8/73 715/230 |

(Continued)

FOREIGN PATENT DOCUMENTS

EP    2463771 A1    6/2012

OTHER PUBLICATIONS

Howard et al., "Automatically Mining Software-Based, Semantically-Similar Words from Comment-Code Mappings," May 18, 2013 IEEE.*

(Continued)

*Primary Examiner* — Insun Kang
(74) *Attorney, Agent, or Firm* — Ference & Associates LLC (57) ABSTRACT Methods and arrangements for providing human-language descriptors for computer code. An interface is used to input computer code, and a human-language descriptor is automatically associated with at least one code identifier in the computer program code, wherein the human-language descriptor is obtained to assist a user in determining a meaning of the at least one code identifier. The human-language descriptor is visually displayed along with the at least one code identifier. Other variants and embodiments are broadly contemplated herein.

18 Claims, 10 Drawing Sheets

(56) References Cited

U.S. PATENT DOCUMENTS

| | | | |
|---|---|---|---|
| 2003/0163323 A1* | 8/2003 | Bluvband | G06F 8/73 704/275 |
| 2003/0221186 A1* | 11/2003 | Bates | G06F 11/3664 717/125 |
| 2005/0216885 A1* | 9/2005 | Ireland | G06F 9/4428 717/108 |
| 2006/0020928 A1 | 1/2006 | Holloway et al. | |
| 2007/0240101 A1* | 10/2007 | Wilson | G06F 8/33 717/104 |
| 2008/0162447 A1* | 7/2008 | Ritter et al. | 707/5 |
| 2008/0263506 A1* | 10/2008 | Broadfoot | G06F 8/10 717/104 |
| 2009/0064112 A1* | 3/2009 | Inagaki | G06F 8/441 717/140 |
| 2009/0077542 A1* | 3/2009 | Chou | G06F 11/3612 717/132 |
| 2010/0145674 A1 | 6/2010 | Dalal et al. | |
| 2010/0146491 A1* | 6/2010 | Hirano | G06F 9/4448 717/137 |
| 2010/0325620 A1* | 12/2010 | Rohde | G06F 9/44589 717/154 |
| 2012/0167036 A1* | 6/2012 | Tanaka | G06F 8/456 717/106 |
| 2012/0331439 A1* | 12/2012 | Zimmermann | G06F 11/3604 717/101 |
| 2013/0326482 A1* | 12/2013 | Greer | G06F 8/73 717/123 |

OTHER PUBLICATIONS

IBM, "Self-describing objects," an IP.com Prior Art Database Technical Disclosure, IPCOMM00152893D, May 17, 2007, 3 pages, IP.com.

\* cited by examiner

```
SELECT vfloe, vfedt
FROM zpcst_vallef
WHERE matnr = vmatnummeret AND
      werks = vplante
```

UNDERSTANDING COMPUTER CODE WITH HUMAN LANGUAGE ASSISTANCE

BACKGROUND

Computer language code can be difficult to understand immediately with an untrained eye. This can lead to immense frustration among many who may need to review code efficiently and understand its content.

BRIEF SUMMARY

In summary, one aspect of the invention provides a method of providing human-language descriptors for computer code, said method comprising: utilizing at least one processor to execute computer code configured to perform the steps of: using an interface to input computer program code; automatically associating a human-language descriptor with at least one code identifier in the computer program code, wherein the human-language descriptor is obtained to assist a user in determining a meaning of the at least one code identifier; and visually displaying the human-language descriptor along with the at least one code identifier.

Another aspect of the invention provides an apparatus for providing human-language descriptors for computer code, said apparatus comprising: at least one processor; and a computer readable storage medium having computer readable program code embodied therewith and executable by the at least one processor, the computer readable program code comprising: computer readable program code configured to provide an interface for inputting computer program code; computer readable program code configured to automatically associate a human-language descriptor with at least one code identifier in the computer program code wherein the human-language descriptor is obtained to assist a user in determining a meaning of the at least one code identifier; and computer readable program code configured to visually display the human-language descriptor along with the at least one code identifier.

A further aspect of the invention provides a computer program product for providing human-language descriptors for computer code, said computer program product comprising: a computer readable storage medium having computer readable program code embodied therewith, the computer readable program code comprising: computer readable program code configured to provide an interface for inputting computer program code; computer readable program code configured to automatically associate a human-language descriptor with at least one code identifier in the computer program code wherein the human-language descriptor is obtained to assist a user in determining a meaning of the at least one code identifier; and computer readable program code configured to visually display the human-language descriptor along with the at least one code identifier.

An additional aspect of the invention provides a method comprising: harvesting pairs comprising computer code identifiers and corresponding human-language descriptors from a source which comprises at least one of: an interactive screen, a domain dictionary-based object and a heuristic process; opening a code editor on a visual interface; visually displaying, at the code editor, computer code comprising the identifiers; looking up the identifiers among the harvested pairs comprising the identifiers and the corresponding human-language descriptors; and applying the human-language descriptors to the displayed identifiers and visually displaying the human-language descriptors at the code editor.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will now be made herebelow to FIGS. 1-9. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 10. In accordance with an example embodiment, most if not all of the process steps, components and outputs discussed with respect to FIGS. 1-9 can be performed or utilized by way of a processing unit or units and system memory such as those indicated, respectively, at 16' and 28' in FIG. 10, whether on a server computer, a client computer, a node computer in a distributed network, or any combination thereof.

Figure 1:
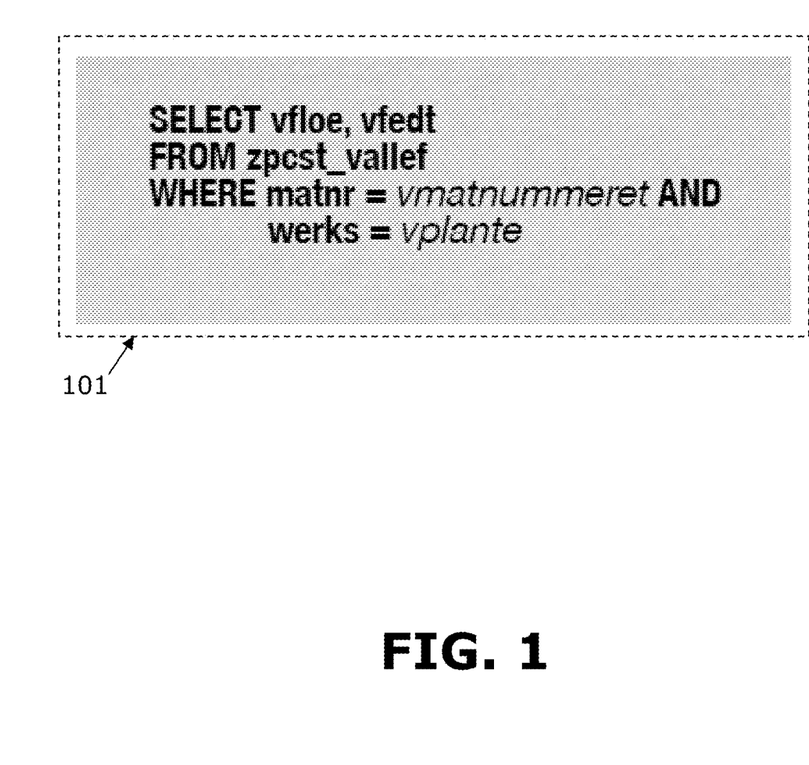
FIG. 1 illustrates a portion of code.
Figure 9:
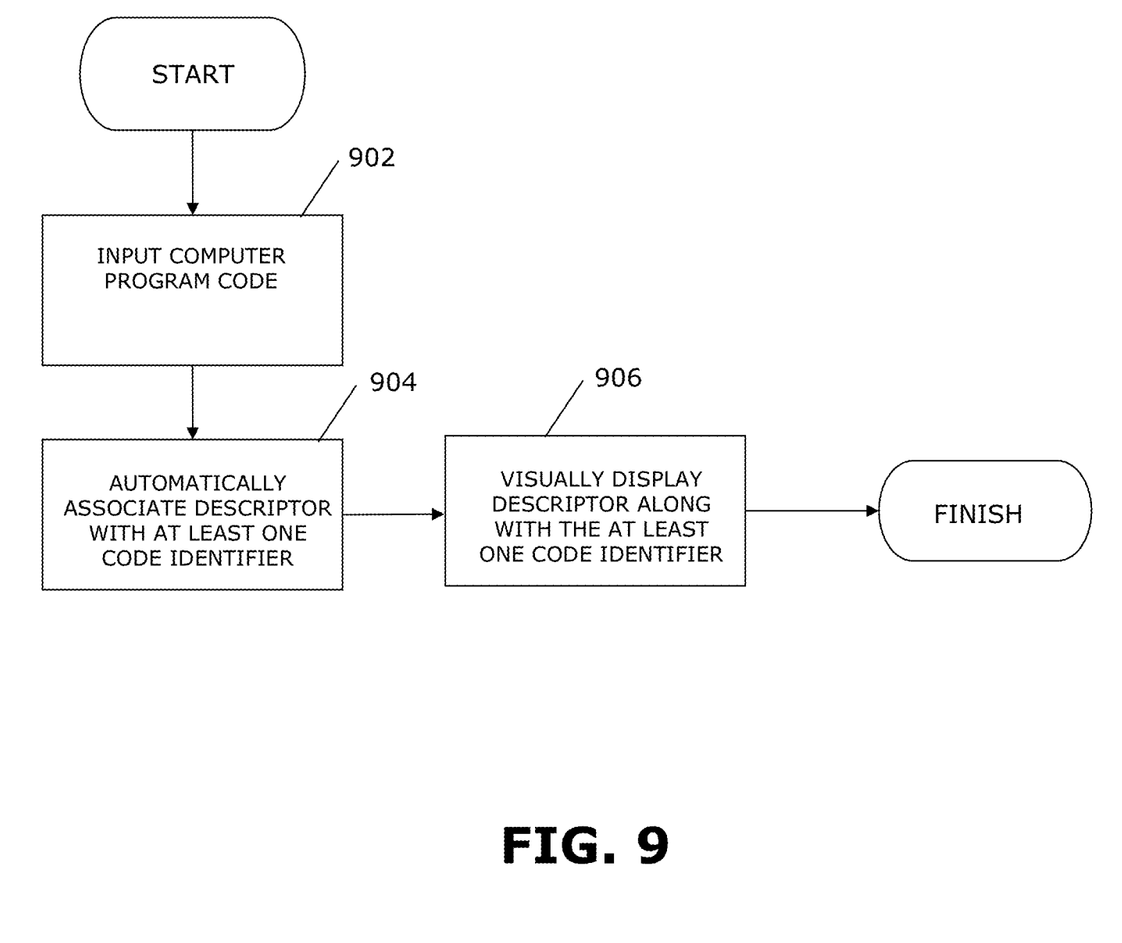
FIG. 9 sets forth a process more generally for providing human-language descriptors for computer code.

To facilitate easier reference, in advancing from FIG. 1 to and through FIG. 9, a reference numeral is advanced by a multiple of 100 in indicating a substantially similar or analogous component or element with respect to at least one component or element found in at least one earlier figure among FIGS. 1-9.

FIG. 1 illustrates a portion of initial SAP ABAP code (Advanced Business Application Programming code, as developed by SAP AG of Walldorf, Germany). While, to the uninitiated eye, it can be made out that in general something is being selected from a table based on certain conditions, it may be difficult even for an experienced programmer to immediately understand what is going on.

Figure 2:
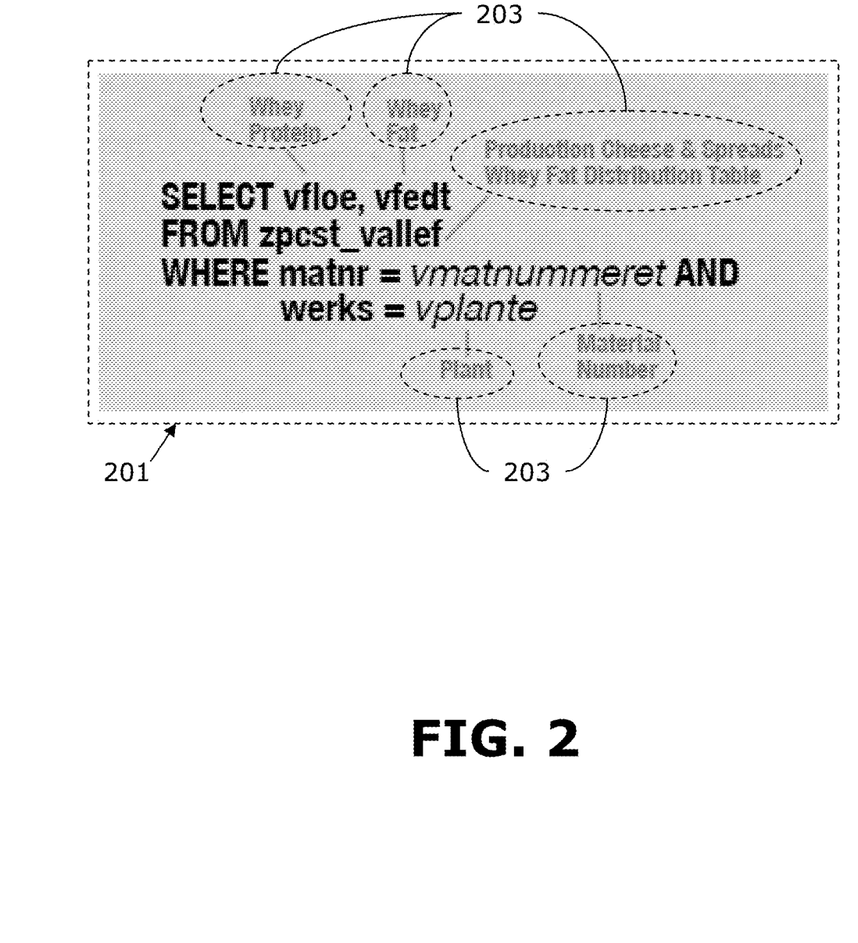
FIG. 2 illustrates the code of FIG. 1, overlaid with descriptions.

In contrast, FIG. 2 illustrates code 201 similar to that in FIG. 1, described in accordance with at least one embodiment of the invention. Thus, human-language descriptors 203 can be associated with different terms in the code. The descriptors may be overlaid on a code editor all at once to result in appearance such as that shown, or they can appear in response to an action on the part of the user, e.g., via clicking on top of a term that then will yield the appearance of a descriptor 203 adjacent. A manner of describing the code, e.g., so as to appear in a manner as depicted in FIG. 2, will now be discussed in more detail.

Figure 3:
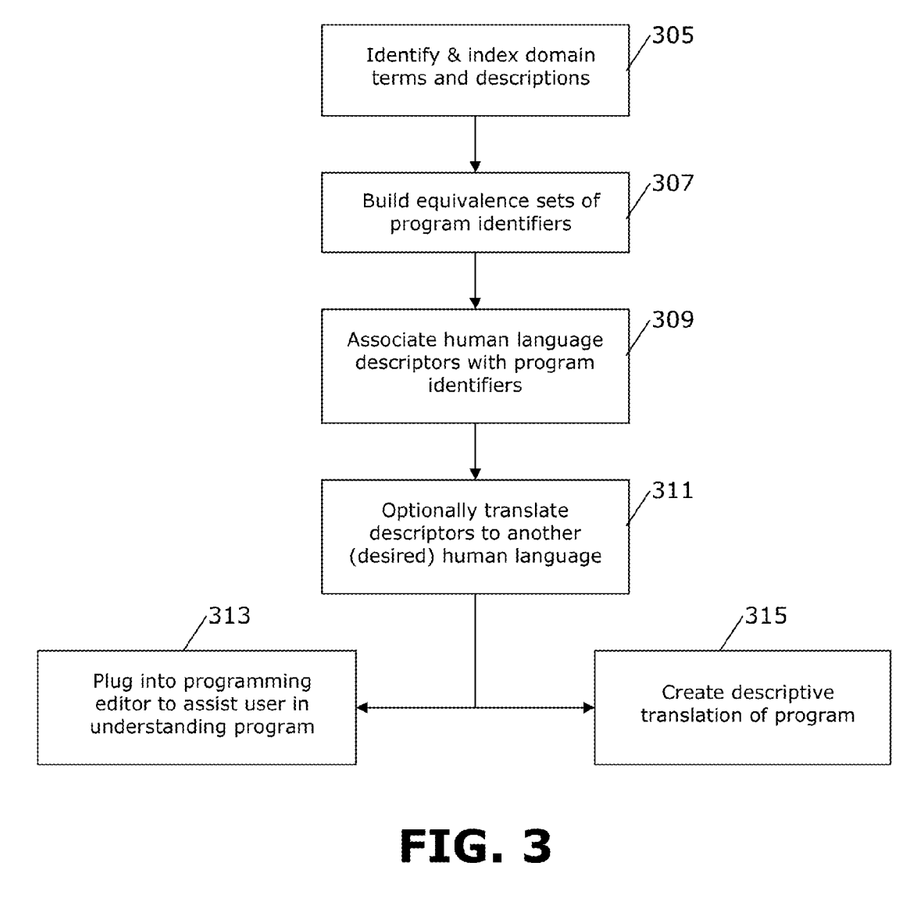
FIG. 3 sets forth a method of understanding code by associating descriptions with identifiers.

FIG. 3 sets forth a method of understanding code by associating descriptions with identifiers, in accordance with at least one embodiment of the invention. First, domain terms and descriptions are identified and indexed (305). Then, equivalence sets of program identifiers are built (307); examples of code identifiers can include, but are not limited to, code units such as program variable names, data-types, table-names, table-field names, etc. Human language descriptions are associated with program (code) identifiers (309), and optionally the descriptions are translated to another desired human language (311). Then, the result of these steps can be to plug into a programming editor to assist the user in understanding the program (313), or a descriptive translation of the program can be created (315). These steps will be described in more detail herebelow, by way of illustrative and non-restrictive working examples.

Figure 4:
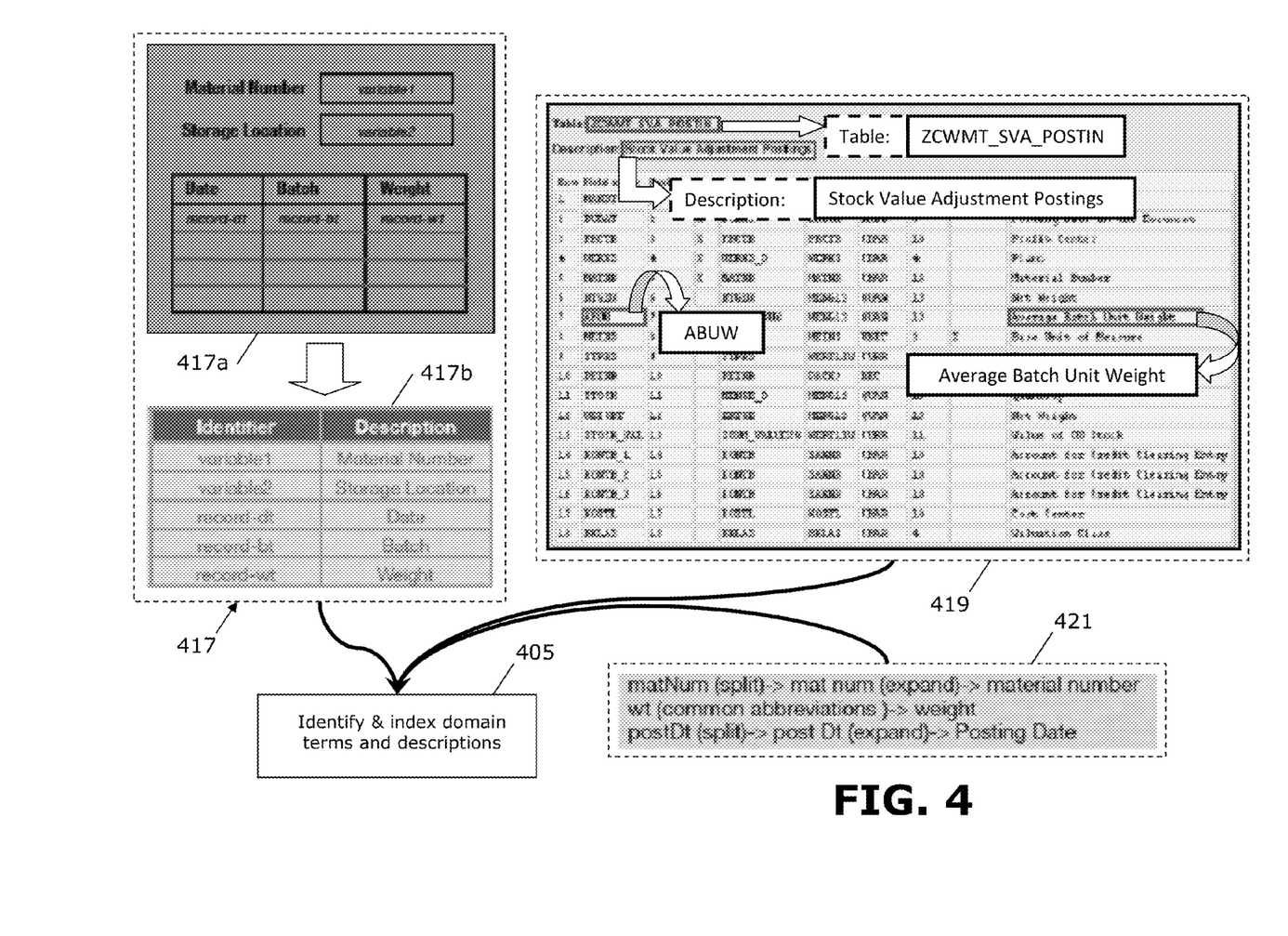
FIG. 4 illustrates several manners of identifying and indexing domain terms and descriptions.

FIG. 4 illustrates several manners of identifying and indexing domain terms and descriptions (405), in accordance with at least one embodiment of the invention; this may also correspond, e.g., to step 305 in FIG. 3. Such manners include, but are not limited to, interactive screens (417), domain dictionary-based objects (419), and heuristic-based approaches (421).

In accordance with at least one embodiment of the invention, interactive screens may be employed (417) to connect variables or other terms, as may be used as code identifiers in programs, with human-language descriptions. Particularly, as shown in a user entry screen 417a, variables may be associated with items such as "material number" and "storage location" while records associated with the entry in question may each be associated with parameters such as data, batch and weight. These associations can then be captured as identifier-description pairs 417b, for subsequent use in providing indexed domain terms and descriptions that can assist a user in understanding computer code terminology. By way of example, the pairs 417b can be derived automatically by extracting layouts from a structured definition or description of user-interface screens.

Alternatively, in accordance with at least one embodiment of the invention, a domain dictionary 419 can be employed to automatically derive associations between identifiers and descriptions. These can be harvested automatically through any suitable arrangement. By way of an illustrative example, a table name, "ZCWMT_SVA_POSTIN", can be associated with its description, "Stock Value Adjustment Postings" and a field name, "ABUW", can be associated with domain text, "Average Batch Unit Weight".

Further, in accordance with at least one embodiment of the invention, heuristic-based associations can be derived (421). By way of an illustrative example, starting with the term "matNum", a function for word splitting (e.g., a camel case heuristic function, which recognizes a lower-case initial letter with an upper-case letter in the middle of the term) can split it into two words, "Mat" and "Num". Then, another expansion function (e.g., based on a recognition of high-frequency abbreviations) finds "mat" mapped to the expansion "material", and "num" mapped to the expansion "number". Thus, "matNum" comes to be associated with "Material Number". In the other examples shown at 421, "wt" is easily expanded to "weight" (as a common abbreviation) and "postDt" is resolved in similar manner to "matNum", to yield "posting date".

Figure 5:
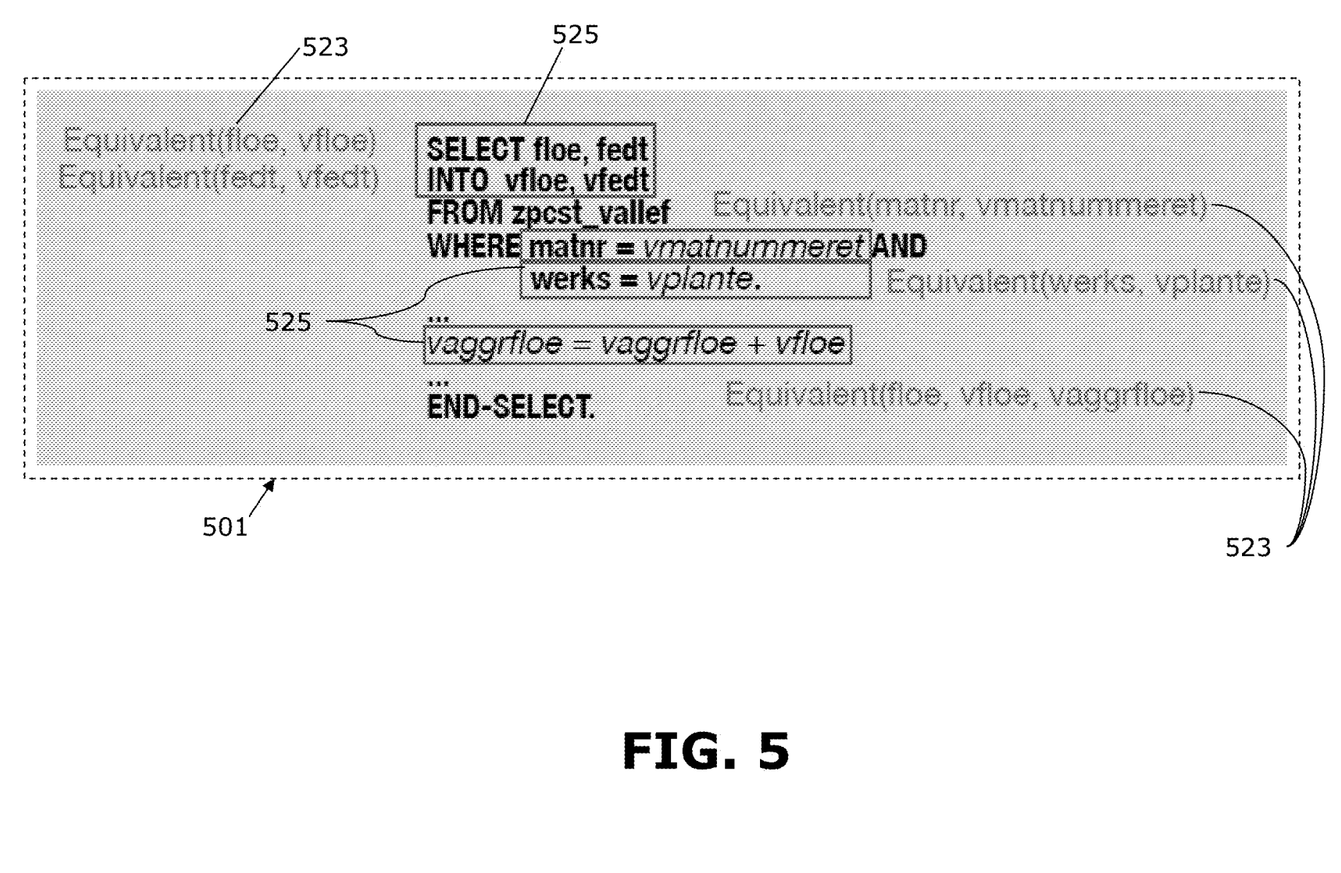
FIG. 5 illustrates a manner of building equivalence sets of program identifiers.

FIG. 5 illustrates a manner of building equivalence sets of program identifiers, in accordance with at least one embodiment of the invention; this may correspond, e.g., to step 307 in FIG. 3. Thus, with respect to code 501, equivalence sets 523 can be created with respect to corresponding code identifiers of code 525, to help determine which terms within the code 501 may be functionally or semantically equivalent to one another, and thus could end up being covered by one and the same human language descriptor. For example, equivalencies here are established between "floe" and "vfloe", and between "werks" and "vplante", owing to relationships established within the code (e.g., "Select" followed by "Into", or a direct equivalency marked by "=") that indicate a strong degree of functional and/or semantic equivalency.

Figure 6:
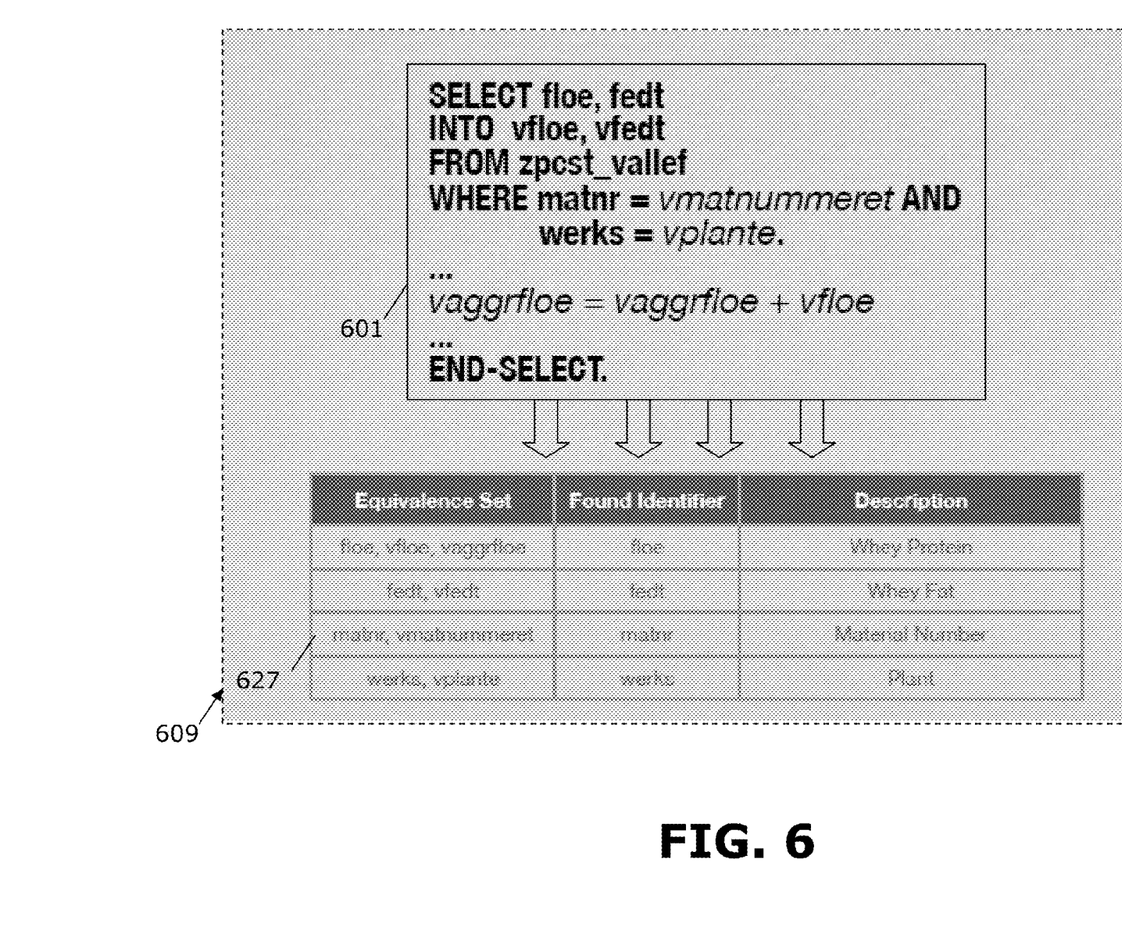
FIG. 6 illustrates a manner of associating human language descriptions to program identifiers.

FIG. 6 illustrates a manner (609) of associating human language descriptions to program (code) identifiers, in accordance with at least one embodiment of the invention; this may correspond, e.g., to step 309 in FIG. 3. Thus, with respect to code 601, associations (627) can be made such that a description found for any of the identifiers in the equivalence set may be applied to all the identifiers in that equivalence set. For instance, for identifiers "floe", "vfloe", and "vaggrfloe" in an equivalence set, a description "Whey Protein" is found for the identifier "floe". This description now comes to be applicable to all the identifiers in this equivalence set. Thus, when the user wants to see what "vfloe" or "vaggrfloe" mean within code, the system readily assists with the description "Whey Protein".

Figure 7:
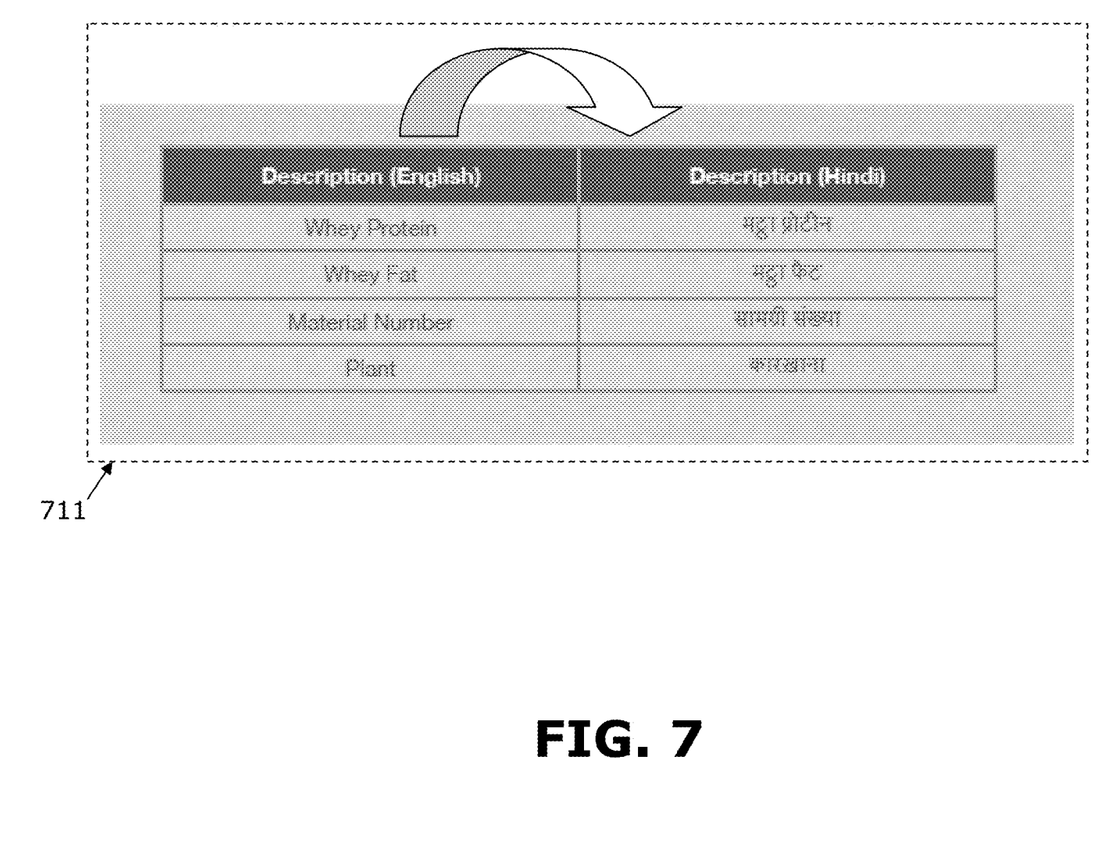
FIG. 7 illustrates a manner of translating descriptions to another desired language.

FIG. 7 illustrates a manner (711) of translating descriptions to another desired human language; this may correspond, e.g., to step 311 in FIG. 3. In the present example, a translation is rendered from English to Hindi; this may be accomplished with essentially any suitable machine translator, and/or with manual input.

Figure 8:
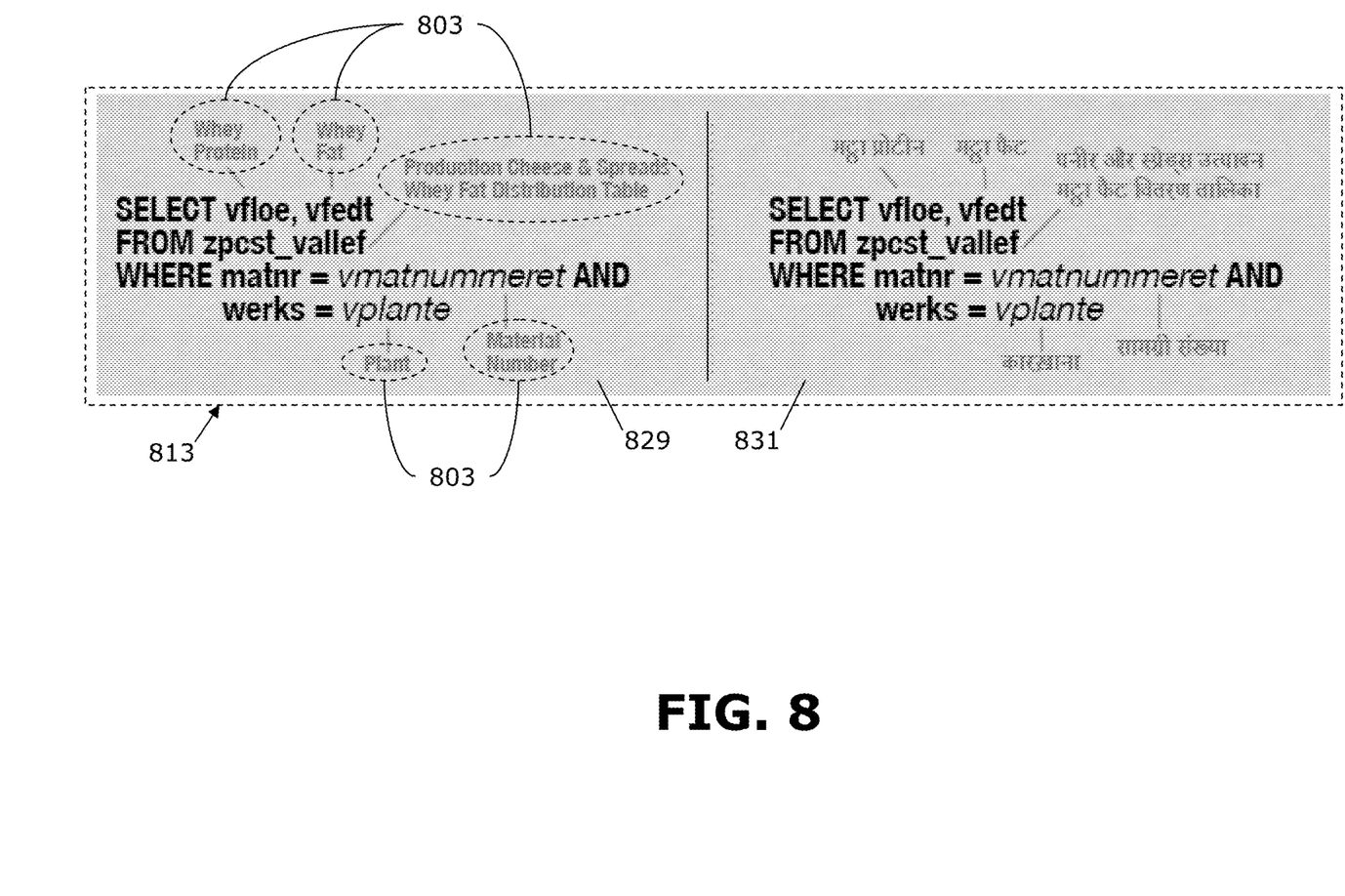
FIG. 8 illustrates a manner of plugging into a program editor to assist a user in understanding program code.

FIG. 8 illustrates a manner (813) of plugging into a program editor to assist a user in understanding program code; this may correspond, e.g., to step 313 in FIG. 3. Here, an end result is shown with both English and Hindi descriptors (with a rendition in English indicated at 829, and one in Hindi at 831; these renditions can be shown individually, e.g., with an option to choose or toggle between both, or can be shown at the same time). Thus, human-language descriptors 803 are appended to different terms in the code; this applies on both sides 829/831.

In accordance with at least one embodiment of the invention, the manner of appending human-language descriptors 803 to code can take any of a variety of forms. Generally, the descriptors 803 can be shown as an overlay in a code editor (e.g., by way of option 313 in FIG. 3), or a descriptive translation of the program may be generated as well (e.g., by way of option 315 in FIG. 3).

FIG. 9 sets forth a process more generally for providing human-language descriptors for computer code, in accordance with at least one embodiment of the invention. It should be appreciated that a process such as that broadly illustrated in FIG. 9 can be carried out on essentially any suitable computer system or set of computer systems, which may, by way of an illustrative and non-restrictive example, include a system such as that indicated at 12' in FIG. 10. In accordance with an example embodiment, most if not all of the process steps discussed with respect to FIG. 9 can be performed by way of a processing unit or units and system memory such as those indicated, respectively, at 16' and 28' in FIG. 10.

As shown in FIG. 9, in accordance with at least one embodiment of the invention, an interface is used to input computer code (902), and a human-language descriptor is automatically associated with at least one code identifier in the computer program code, wherein the human-language descriptor is obtained to assist a user in determining a meaning of the at least one code identifier (904). The human-language descriptor is visually displayed along with the at least one code identifier (906).

Figure 10:
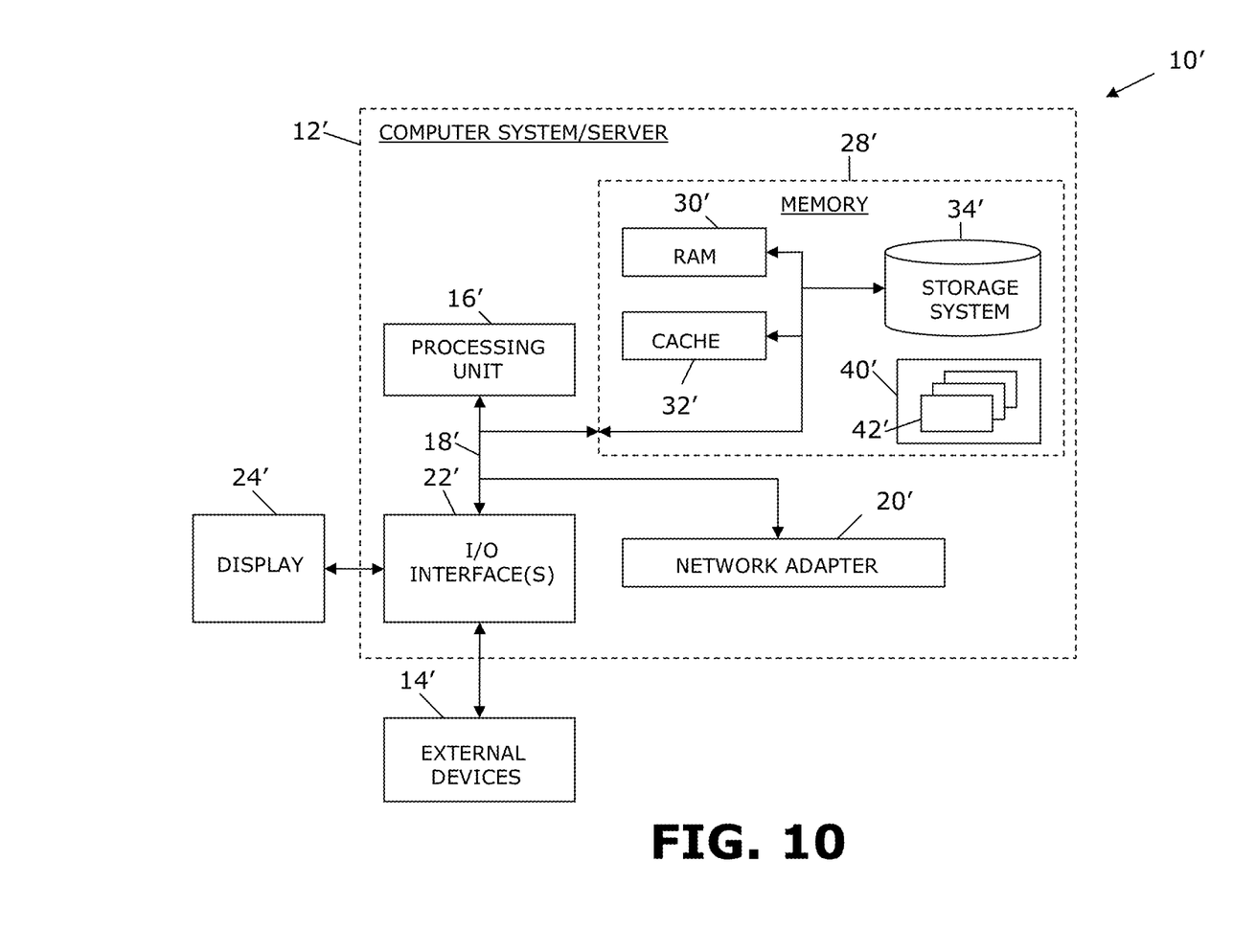
FIG. 10 illustrates a computer system.

Referring now to FIG. 10, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture. Such an article of manufacture can include instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method of providing human-language descriptors for computer code, said method comprising:
    displaying, on a display device, an interface to display computer program code;
    identifying by at least one processor domain terms and descriptions associated with at least one code identifier in the computer program code, wherein the at least one code identifier is a user provided previously stored computer code variable, wherein the computer code variable describes a storage location as used in a computer programming language;
    creating by the at least one processor at least one equivalence set with respect to the at least one code identifier, wherein the at least one equivalence set comprises an identification of code identifiers within the computer program code that are equivalent to one another, wherein the code identifiers that are equivalent to one another comprise code identifiers having a strong degree of equivalence selected from the group consisting of: functional equivalence and semantic equivalence;
    automatically associating a text-based human-language descriptor, based on the identified domain terms, descriptions and the at least one equivalence set, with the at least one code identifier in the computer program code, wherein the text-based human-language descriptor is obtained to assist a user in determining a meaning of the at least one code identifier; and
    visually displaying, within the interface, the text-based human-language descriptor along with the at least one code identifier.

2. The method according to claim 1, comprising:
    creating a library of text-based human-language descriptors, based on the identifying domain terms and descriptions, for linking with a set of code identifiers;
    said associating comprising obtaining a text-based human-language descriptor from the library of text-based human-language descriptors.

3. The method according to claim 2, wherein said identifying comprises extracting correspondences between code identifiers and text-based human-language descriptors via employing at least one of: an interactive screen, a domain dictionary-based object and a heuristic process.

4. The method according to claim 3, wherein said employing of an interactive screen comprises extracting pairs of code identifiers and text-based human-language descriptors from a structured description of a user interface screen.

5. The method according to claim 3, wherein said employing of a domain dictionary-based object comprises harvesting pairs of code identifiers and text-based human-language descriptors from a domain dictionary.

6. The method according to claim 1, wherein said associating comprises linking the text-based human-language descriptor to the at least one equivalence set of code identifiers.

7. The method according to claim 1, comprising additionally translating the text-based human-language descriptor from a first human language to a second human language.

8. The method according to claim 1, wherein said displaying comprises at least one of: providing an overlay in a code editor, and providing a descriptive translation of the code.

9. An apparatus for providing human-language descriptors for computer code, said apparatus comprising:
    at least one processor; and
    a computer readable storage medium having computer readable program code embodied therewith and executable by the at least one processor, the computer readable program code comprising:
    computer readable program code configured to display an interface for displaying computer program code;
    computer readable program code configured to identify domain terms and descriptions associated with at least one code identifier in the computer program code, wherein the at least one code identifier is a user provided previously stored computer code variable, wherein the computer code variable describes a storage location as used in a computer programming language;
    computer readable program code configured to create at least one equivalence set with respect to the at least one code identifier, wherein the at least one equivalence set comprises an identification of code identifiers within the computer program code that are equivalent to one another, wherein the code identifiers that are equivalent to one another comprise code identifiers having a strong degree of equivalence selected from the group consisting of: functional equivalence and semantic equivalence;
    computer readable program code configured to automatically associate a text-based human-language descriptor, based on the identified domain terms, descriptions and the at least one equivalence set, with the at least one code identifier in the computer program code wherein the text-based human-language descriptor is obtained to assist a user in determining a meaning of the at least one code identifier; and
    computer readable program code configured to visually display, within the interface, the text-based human-language descriptor along with the at least one code identifier.

10. A computer program product for providing human-language descriptors for computer code, said computer program product comprising:
    a non-transitory computer readable storage medium having computer readable program code embodied therewith, the computer readable program code comprising:
    computer readable program code configured to display an interface for displaying computer program code;
    computer readable program code configured to identify domain terms and descriptions associated with at least one code identifier in the computer program code, wherein the at least one code identifier is a user provided previously stored computer code variable, wherein the computer code variable describes a storage location as used in a computer programming language;

computer readable program code configured to create at least one equivalence set with respect to the at least one code identifier, wherein the at least one equivalence set comprises an identification of code identifiers within the computer program code that are equivalent to one another, wherein the code identifiers that are equivalent to one another comprise code identifiers having a strong degree of equivalence selected from the group consisting of: functional equivalence and semantic equivalence;

computer readable program code configured to automatically associate a text-based human-language descriptor, based on the identified domain terms, descriptions and the at least one equivalence set, with the at least one code identifier in the computer program code wherein the text-based human-language descriptor is obtained to assist a user in determining a meaning of the at least one code identifier; and computer readable program code configured to visually display, within the interface, the text-based human-language descriptor along with the at least one code identifier.

11. The computer program product according to claim 10, wherein said computer readable program code is configured to:

create a library of text-based human-language descriptors, based on the identifying domain terms and descriptions for linking with a set of code identifiers; and automatically associate the text-based human-language descriptor with at least one code identifier in the computer program code via obtaining a text-based human-language descriptor from the library of text-based human-language descriptors.

12. The computer program product according to claim 11, wherein said computer readable program code is configured to extract correspondences between code identifiers and text-based human-language descriptors via employing at least one of: an interactive screen, a domain dictionary-based object and a heuristic process.

13. The computer program product according to claim 12, wherein said computer readable program code is configured to employ an interactive screen via extracting pairs of code identifiers and text-based human-language descriptors from a structured description of a user interface screen.

14. The computer program product according to claim 12, wherein said computer readable program code is configured to employ a domain dictionary-based object via harvesting pairs of code identifiers and text-based human-language descriptors from a domain dictionary.

15. The computer program product according to claim 10, wherein said computer readable program code is configured to link the text-based human-language descriptor to the at least one equivalence set of code identifiers.

16. The computer program product according to claim 10, wherein said computer readable program code is configured to additionally translate the text-based human-language descriptor from a first human language to a second human language.

17. The computer program product according to claim 10, wherein said computer readable program code is configured to display via at least one of: providing an overlay in a code editor, and providing a descriptive translation of the code.

18. A method comprising:

harvesting pairs comprising computer code identifiers in the computer program code and corresponding text-based human-language descriptors from a source which comprises at least one of: an interactive screen, a domain dictionary-based object and a heuristic process, wherein at least one code identifier of the code identifiers is a user provided previously stored computer code variable, wherein the computer code variable describes a storage location as used in a computer programming language;

the harvesting pairs comprising creating at least one equivalence set with respect to a corresponding code identifier of the code identifiers, wherein the at least one equivalence set comprises an identification of code identifiers within the computer program code that are equivalent to one another, wherein the code identifiers that are equivalent to one another comprise code identifiers having a strong degree of equivalence selected from the group consisting of: functional equivalence and semantic equivalence, wherein the text-based human-language descriptors are automatically associated with the code identifiers based on identified domain terms, descriptions, and the at least one equivalence set;

opening a code editor on a visual interface;

visually displaying, at the code editor, computer code comprising the identifiers;

looking up the identifiers among the harvested pairs comprising the identifiers and the corresponding text-based human-language descriptors; and applying the text-based human-language descriptors to the displayed identifiers and visually displaying the text-based human-language descriptors at the code editor.

* * * * *